US006999997B2

(12) United States Patent
Clarke et al.

(10) Patent No.: US 6,999,997 B2
(45) Date of Patent: Feb. 14, 2006

(54) METHOD AND APPARATUS FOR COMMUNICATION OF MESSAGE DATA USING SHARED QUEUES

(75) Inventors: Paul Geoffrey Clarke, Southampton (GB); Anthony John O'Dowd, Winchester (GB); Mayur Raja, Chandlers Ford (GB)

(73) Assignee: International Business Machines Corporation, Armonk, NY (US)

( * ) Notice: Subject to any disclaimer, the term of this patent is extended or adjusted under 35 U.S.C. 154(b) by 601 days.

(21) Appl. No.: 09/960,447

(22) Filed: Sep. 21, 2001

(65) Prior Publication Data

US 2002/0062356 A1 May 23, 2002

(30) Foreign Application Priority Data

Nov. 18, 2000 (GB) .................................. 0028237

(51) Int. Cl.
*G06F 15/167* (2006.01)
(52) U.S. Cl. ..................... 709/213; 709/217; 709/229; 709/239
(58) Field of Classification Search ............... 709/213, 709/217, 229, 239
See application file for complete search history.

(56) References Cited

U.S. PATENT DOCUMENTS

| 5,390,328 | A | * | 2/1995 | Frey et al. ................... 719/315 |
|---|---|---|---|---|
| 5,457,793 | A | * | 10/1995 | Elko et al. ................... 707/205 |
| 5,537,574 | A | * | 7/1996 | Elko et al. ................... 711/141 |
| 5,561,809 | A | * | 10/1996 | Elko et al. ................... 709/213 |
| 5,630,050 | A | * | 5/1997 | Neuhard et al. ............... 714/27 |
| 6,108,689 | A | * | 8/2000 | Fagen et al. ................. 709/206 |
| 6,397,250 | B1 | * | 5/2002 | Clarke ......................... 709/225 |
| 6,430,622 | B1 | * | 8/2002 | Aiken et al. ................. 709/245 |
| 6,564,205 | B1 | * | 5/2003 | Iwata et al. .................... 707/2 |
| 6,571,270 | B1 | * | 5/2003 | Lai et al. ..................... 718/101 |
| 6,633,560 | B1 | * | 10/2003 | Albert et al. ................. 370/351 |
| 6,742,045 | B1 | * | 5/2004 | Albert et al. ................. 709/238 |
| 2002/0059316 | A1 | * | 5/2002 | Kettley et al. ............... 707/200 |
| 2002/0062356 | A1 | * | 5/2002 | Clarke et al. ................ 709/213 |
| 2002/0066080 | A1 | * | 5/2002 | O'Dowd ...................... 717/128 |
| 2002/0087507 | A1 | * | 7/2002 | Hopewell et al. ............... 707/1 |
| 2002/0095603 | A1 | * | 7/2002 | Godwin et al. .............. 713/201 |
| 2002/0129082 | A1 | * | 9/2002 | Baskey et al. ............... 709/102 |
| 2002/0133602 | A1 | * | 9/2002 | Godwin et al. .............. 709/229 |
| 2003/0023702 | A1 | * | 1/2003 | Kokku et al. ................ 709/216 |
| 2003/0041135 | A1 | * | 2/2003 | Keyes et al. ................. 709/223 |
| 2003/0065782 | A1 | * | 4/2003 | Nishanov et al. ............ 709/226 |

OTHER PUBLICATIONS

Microsoft Press Computer Dictionary, 3rd Edition, Microsoft Press, pp. 217 and 390.*
IEEE 100, The Authoritative Dictionary of IEEE Standards Terms, 7th Edition, Standards Information Network, pp. 482 and 897.*

* cited by examiner

*Primary Examiner*—Reba I. Elmore
(74) *Attorney, Agent, or Firm*—A. Bruce Clay; Hoffman, Warnick & D'Alessandro LLC

(57) ABSTRACT

A method and apparatus for communicating message data between a plurality of subsystems (201, 202, 301, 302, 303, 404, 406, 408) in the form of distributed resource managers. The subsystems are coupled together through a coupling means (206, 306, 410) with a shared memory with at least one shared queue (308, 414) in the shared memory. Access to the shared queue (308, 414) is available from each of the coupled subsystems and message data can be communicated between the subsystems via the shared queue (308, 414). Each subsystem has a long running process (304) checking the shared queue for messages for that subsystem.

1 Claim, 4 Drawing Sheets

METHOD AND APPARATUS FOR COMMUNICATION OF MESSAGE DATA USING SHARED QUEUES

FIELD OF THE INVENTION

The present invention relates to the field of communicating message data between application programs on different nodes of a computer network via message queues.

BACKGROUND

Application programs running on different computers or nodes within a network are enabled to communicate and hence interoperate using messaging and queuing. Communication by messaging and queuing enables application programs to communicate across a network without having a private, dedicated, logical connection to link them. Application programs communicate by putting messages on message queues and by taking messages from message queues.

The application programs talk directly to a communications manager product such as a queue manager. Each node of the network has a queue manager which enables communication between the application programs running on the computers in different nodes of the network. The queue managers interface to the application programs through a message queue interface that is invoked by the application programs. The message queue interface supports many different operating system platforms enabling communication to be unaffected by the application programs operating on different operating systems.

Intercommunication means sending messages from one queue manager, known as the local or source queue manager, to another queue manager, known as the remote or target queue manager. The target queue manager could be running on the same platform as the source queue manager or could be on a different platform. This is called a distributed environment.

In prior art systems, distributed queuing works by a first application putting a message destined for an application governed by a remote queue manager, the local queue manager stores the message on a transmission queue, which is a queue on the local queue manager, until it is ready to send the message to the remote queue manager. The transmission queue is a type of local queue on which messages are stored before they can be successfully transmitted and stored on the remote queue manager.

Messages are transmitted between queue managers on a channel which is a one-way communication link between two queue managers. Software which handles the sending and receiving of messages is called a message channel agent (MCA). To send a message from queue manager A to queue manager B, a sending message channel agent on queue manager A must set up a communications link to queue manager B. A receiving message channel agent must be started on queue manager B to receive messages from the communication link. This one-way path consisting of the sending MCA, the communication link, and the receiving MCA is the channel. The sending MCA takes the messages from the transmission queue and sends them down the channel to the receiving MCA. The receiving MCA receives the messages and puts them on to the destination queues.

The sending and receiving MCAs can all run inside a channel initiator or mover which uses an address space under the control of the queue manager.

Queue managers which are logically associated in some way can be grouped in a cluster in which queues on each queue manager are available to every other queue manager in the cluster. Assuming they have the necessary network infrastructure in place, any queue manager in the cluster can send a message to any other queue manager in the cluster but this has conventionally relied on the standard distributed queuing mechanisms with the inherent overhead of establishing channel definitions before sending any data. Each queue manager in the cluster has a single transmission queue from which it can transmit messages to any other queue manager in the cluster. Each queue manager in the cluster needs to define one cluster-receiver channel and one cluster-sender channel.

SUMMARY OF INVENTION

According to a first aspect of the present invention there is provided a method of communicating message data between a plurality of subsystems which are distributed across a data communications network, the method comprising: coupling the distributed subsystems together through a coupling means with a shared memory; providing at least one shared queue in the shared memory; providing access to the shared queue from each of the coupled subsystems; and communicating message data between the subsystems by means of the shared queue.

The invention enables improved message transfer performance compared with solutions which rely on the establishment of channels between each of the subsystems for each intra-group communication. Message transfer can be faster and uses less processing capacity. The invention can avoid many of the object definitions required for standard distributed queuing.

Preferably, the plurality of subsystems is a distributed network of resource managers and the plurality of subsystems are all part of a sysplex.

At least one application program may be connected to a subsystem and the subsystem manages the message data for the at least one application program.

Preferably, the coupling means is a coupling facility with data structures for the at least one shared queue and a database storing queue definitions for the at least one shared queue.

Optimally, the at least one shared queue includes a shared transmission queue. Each subsystem has a long running process to check the shared transmission queue for message data for that subsystem. The subsystems may also have local non-shared queues.

Message data is sent from a first subsystem to a second subsystem by the first subsystem putting a message on the shared transmission queue and the second subsystem getting the message from the shared transmission queue.

According to a second aspect of the present invention, there is provided an apparatus for communicating message data, comprising: a plurality of subsystems coupled together by a coupling means with a shared memory; the shared memory having at least one shared queue accessible by each of the subsystems; and wherein message data is communicated between the subsystems by means of the shared queue.

According to a third aspect of the present invention, there is provided a computer program product stored on a computer readable storage medium, comprising computer readable program code means for performing the steps of: providing at least one shared queue in a shared memory; providing access to the shared queue from each of a plurality of subsystems coupled to the shared memory; and communicating data between the subsystems by means of the shared queue.

BRIEF DESCRIPTION OF DRAWINGS

An embodiment of the invention will now be described in more detail, by way of example only, with reference to the accompanying drawings in which.

DETAILED DESCRIPTION OF PREFERRED EMBODIMENTS

Figure 1:
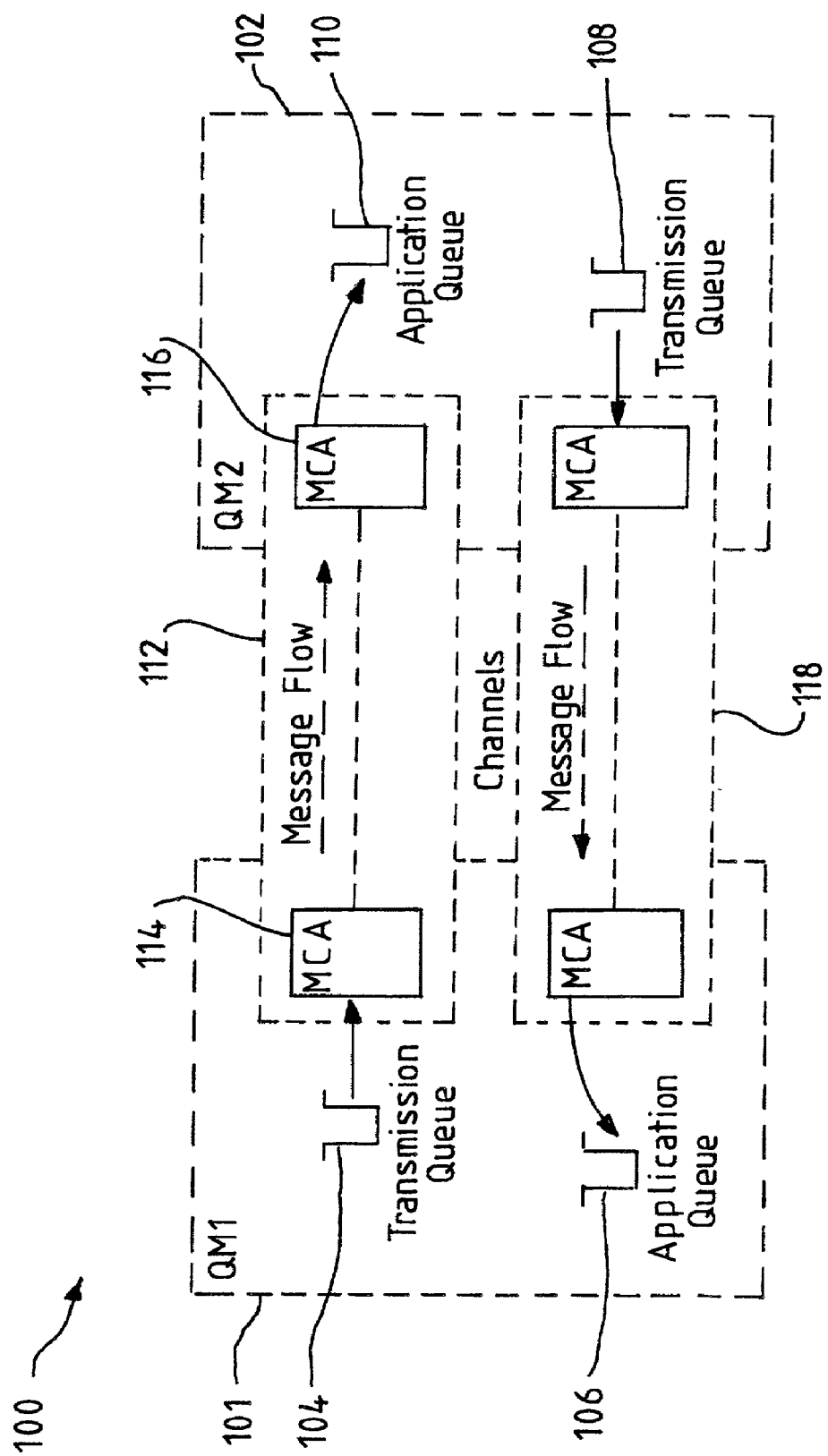
FIG. 1 shows a representation of message transfer as known from the prior art.

Referring to the figures, FIG. 1 shows a representation of the method of message transfer known from the prior art.

FIG. 1 shows a distributed queuing environment 100 with a first queue manager 101 which manages messages from application programs on the same node of a network as the queue manager 101. A second queue manager 102 manages messages from application programs on a separate node of a network.

The first queue manager 101 has local queues which include a transmission queue 104 for transmitting messages to queue manager 102, and an application queue 106 for messages destined for an application connected to the first queue manager 101. The second queue manager 102 has local queues including a transmission queue 108 for transmitting messages to queue manager 101, and an application queue 110 for messages destined for an application connected to the second queue manager 102.

An application which is connected to the first queue manager 101 sends a message destined for an application connected to the second queue manager 102 by putting the message onto a queue in the first queue manager 101. The first queue manager 101 stores the message on the transmission queue 104 until it is ready to send the message to the second queue manager 102.

Messages are transmitted from the first queue manager 101 to the second queue manager 102 on a channel 112 which is a one-way communication link between the two queue managers 101, 102. Software which handles the sending and receiving of messages is called a message channel agent (MCA). A sending MCA 114 on the first queue manager 101 sets up a communications link to the second queue manager 102. A receiving MCA 116 is started on the second queue manager 102 to receive the message from the communications link.

The sending MCA 114 takes the message from the transmission queue 104 and sends it down the channel to the receiving MCA 116. The receiving MCA 116 receives the message and puts it on to the application queues 110 for the destination application. The same procedure is followed for sending a message back from the second queue manager 102 to the first queue manager 101 via a separate channel 118.

The present invention removes the need for channels and message channel agents.

A group of queue managers can form a queue sharing group in which the queue managers all have access to a shared message queue. A plurality of queue managers can be coupled together through a coupling facility (CF). The coupling facility comprises a microprocessor unit and list structures. A shared data repository is used to hold shared queue definitions while the message data is held in the list structures. The data repository and the coupling facility are accessible from all the queue managers in the queue sharing group so the message data can be communicated via shared queues.

Figure 2:
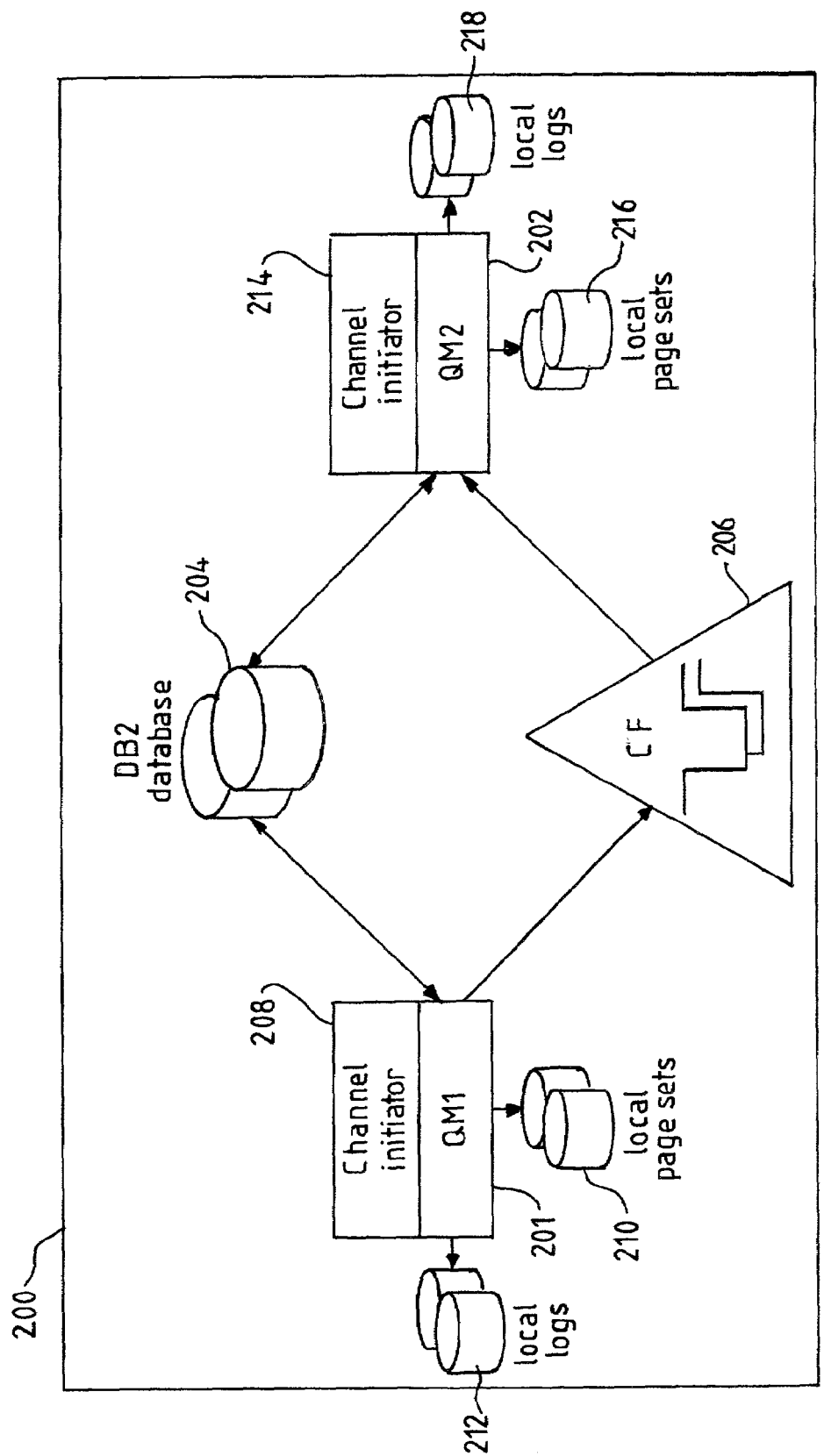
FIG. 2 shows a representation of a queue sharing group in accordance with the present invention.

FIG. 2 shows a group of queue managers which share queues. A queue sharing group 200 consists of a number of queue managers 201, 202 running in a sysplex. The queue managers 201, 202 are able to access the same object definitions and message data concurrently. The shareable object definitions are stored in a shared repository 204 and the messages are held inside a coupling facility 206. The database 204 and the coupling facility 206 hold resources that are owned by the several queue managers 201, 202. The database 204 and the coupling facility 206 may hold additional resources that are not owned by the queue managers 201, 202. For example, these additional resources may be owned by other applications like IBM's CICS (Customer Information Control System) transactional data processing system, IMS information management system, etc. (CICS and IMS are trademarks of IBM Corporation).

The shared repository 204 stores the definitions of objects including the shared queues and channels. A queue only needs to be defined once and then it can be accessed by all the queue managers 201, 202 in the queue sharing group 200. This means that there are fewer definitions to make.

The queue managers 201, 202 share queues and all have access to the same set of shared queues. The shared queues can be accessed by any queue manager 201, 202 in the queue sharing group 200. This means that a message can be put on to a shared queue on one queue manager and the same message can be retrieved from the queue from a different queue manager. This provides a rapid mechanism for communication within a queue sharing group that does not require channels to be active between queue managers.

An application program can connect to any of the queue managers 201, 202 within the queue sharing group 200. As all the queue managers 201, 202 in the queue sharing group 200 can access all the shared queues, the application does not depend on the availability of a specific queue manager 201, 202; any queue manager 201, 202 in the queue sharing group 200 can service the queue. This gives greater availability as any remaining active queue managers 201, 202 in the queue sharing group 200 can continue processing the queue if one of the queue managers 201, 202 has a problem or fails. FIG. 2 shows a simplified configuration with only two queue managers 201, 202 in the queue sharing group 200. Many more queue managers could form a queue sharing group.

Each queue manager 201, 202 has a channel initiator 208, 214 and its own local page sets 210, 216 and log data sets 212, 218. A queue manager belongs to one queue sharing group only and all queue managers in the group are in the same sysplex.

The messages in shared queues are stored on list structures in the coupling facility 206. The messages can be accessed by any queue manager 201, 202 in the same sysplex. All queue managers 201, 202 also maintain their own logs 212, 218 and page sets 210, 216 to use non-shared local queues and they store definitions of private objects on page set zero. When a queue manager runs it must be possible to distinguish between objects defined privately to that queue manager and objects available to all queue managers in the queue sharing group. An attribute is used to make this distinction.

Messages that are put on to shared queues are not stored on page sets 210, 216 and are not logged in the queue manager log 212, 218. The coupling facility is usually configured to run on a different power supply to any of the queue managers and is generally resilient to software and hardware failures and power outages. Hence, messages put on to shared queues survive across queue manager restarts.

The coupling facility comprises a microprocessor unit and list structures. A coupling facility list structure is dedicated to a specific queue sharing group, but a coupling facility can hold multiple coupling facility list structures for the same queue sharing group, as well as coupling facility list structures for more than one queue sharing group.

Each queue manager includes a coupling facility manager component which provides connection services for connecting to the coupling facility list structure to perform operations on list structure entries such as read, write, delete, connect, disconnect, update and move. The coupling facility manager component handles all requests to the coupling facility with appropriate levels of concurrency, serialization and integrity. A data repository manager component controls requests to the data repository including initiating connect and disconnect from the repository and read, write, delete and update services.

A queue sharing group has a generic interface that allows the network to view the group as a single entity. This is achieved by having a single generic address that can be used to connect to any queue manager within the group. Each queue manager within the queue sharing group listens for inbound session requests on an address that is logically related to the generic address.

A shared transmission queue is used to store messages before they are moved from the queue sharing group to the destination. It is a shared queue and it is accessible to all queue managers in the queue sharing group.

A channel can only be started on a channel initiator if it has access to a channel definition for a channel with that name. A channel definition can be defined to be private to a queue manager or stored on the shared repository and available anywhere in the group. This means that a group defined channel is available on any channel initiator in the queue sharing group.

An inbound channel is a shared channel if it is connected to the queue manager through a group listener. It is connected either through the generic interface to the queue sharing group from where it is directed to a queue manager within the group or it is targeted at a specific queue manager's group port.

An outbound channel is a shared channel if it moves messages from the shared transmission queue.

Intra-group queuing (IGQ) can effect fast and inexpensive transfer of messages between queue managers in a queue sharing group (QSG) without the need to define channels between the queue managers. This uses a system queue which is a shared transmission queue. Each queue manager in the queue sharing group starts a task called an intra-group queuing agent which waits for messages, that are destined for its queue manager, to arrive on this queue. When such a message is detected, it is removed from the queue and placed on the correct destination queue.

When applications open and put messages to remote queues, the local queue manager determines whether intra-group queuing should be used for message transfer. If intra-group queuing is to be used, the local queue manager places the message on to the shared transmission queue and the intra-group queuing agent on the target queue manager retrieves the message and places it on the destination queue.

Figure 3:
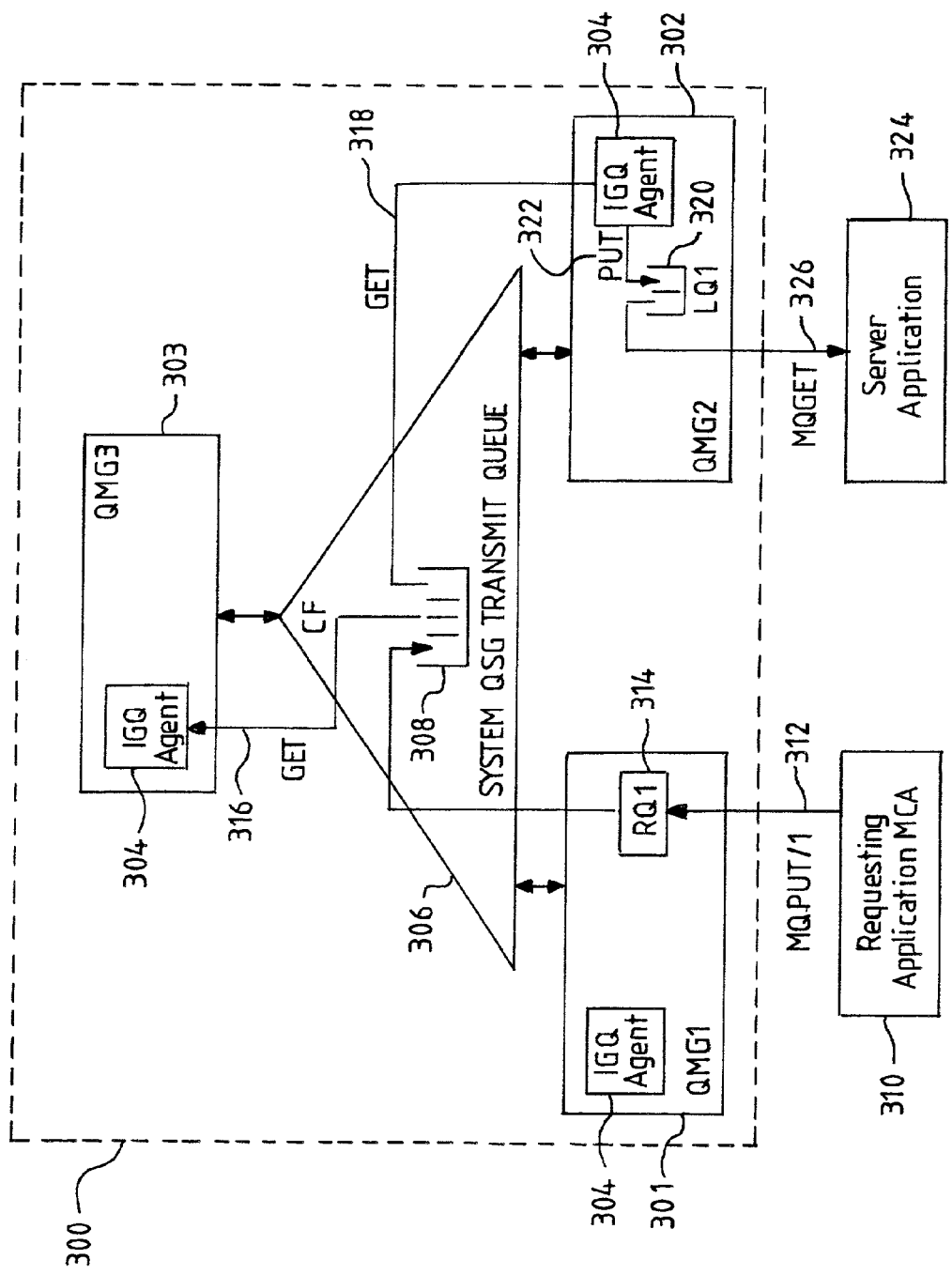
FIG. 3 shows a representation of intra-group queuing in a queue sharing group in accordance with the present invention.

Referring to FIG. 3, a queue sharing group 300 is shown with three queue managers 301, 302 and 303 which are all connected to a coupling facility 306. Each of the queue managers 301, 302, 303 has an intra-group queuing agent 304. The intra-group queuing agent 304 is the task, started at each queue manager initialisation, that waits for suitable messages to arrive on a shared transmission queue 308 in the coupling facility 306. The intra-group queuing agents 304 are long running processes, one of which is continually executing in each queue manager in the queue sharing group. The intra-group queuing agents 304 retrieve suitable messages from the shared transmission queue 308 and deliver them to the destination queues. The intra-group queuing agents 304 are always started for each queue manager because intra-group queuing is used by the queue manager itself for its own internal processing.

An application 310 which is connected to the first queue manager 301 puts a message 312 to a remote queue 314 in the first queue manager 301. If intra-group queuing is enabled, the name of the shared transmission queue 308 appears in the name resolution path when opening remote queues. The local queue manager determines the eligibility of messages for intra-group queuing. For example, only messages of a certain length may be suitable because the implementation of shared queues within the coupling facility may have limitations on the message length. Also, only non-persistent messages can be sent via the shared transmission queue. The first queue manager 301 determines that the message put by the requesting application 310 is suitable for intra-group queuing and puts the message on to the shared transmission queue 308 in the coupling facility 306 with an identifier (the separate message descriptor Correl-ID) that identifies the target queue manager for which the message is destined.

The intra-group queuing agents 304 running on the other queue managers 302, 303 in the queue sharing group 300 get the message 316, 318 from the shared transmission queue 308. The intra-group queuing agent 304 of the second queue manager 302 retrieves a message that identifies the second queue manager 302 as the target queue manager, and puts the message 322 in a local queue 320 in the second queue manager 302. A server application 324 connected to the second queue manager 302 gets the message 326 from the local queue 320.

As only one intra-group queuing agent 304 is needed for the delivery of a message to a target queue instead of two intermediate sender and receiver agents, the delivery of messages using intra-group queuing can be less expensive than the delivery of messages using channels. Applications external to a queue-sharing group can deliver messages to a queue residing on any queue manager in the queue sharing group while being connected only to a particular queue manager in the queue sharing group. This is because messages arriving on a receiver channel, destined for a queue on a remote queue manager can be transparently sent to the destination queue using intra-group queuing.

Figure 4:
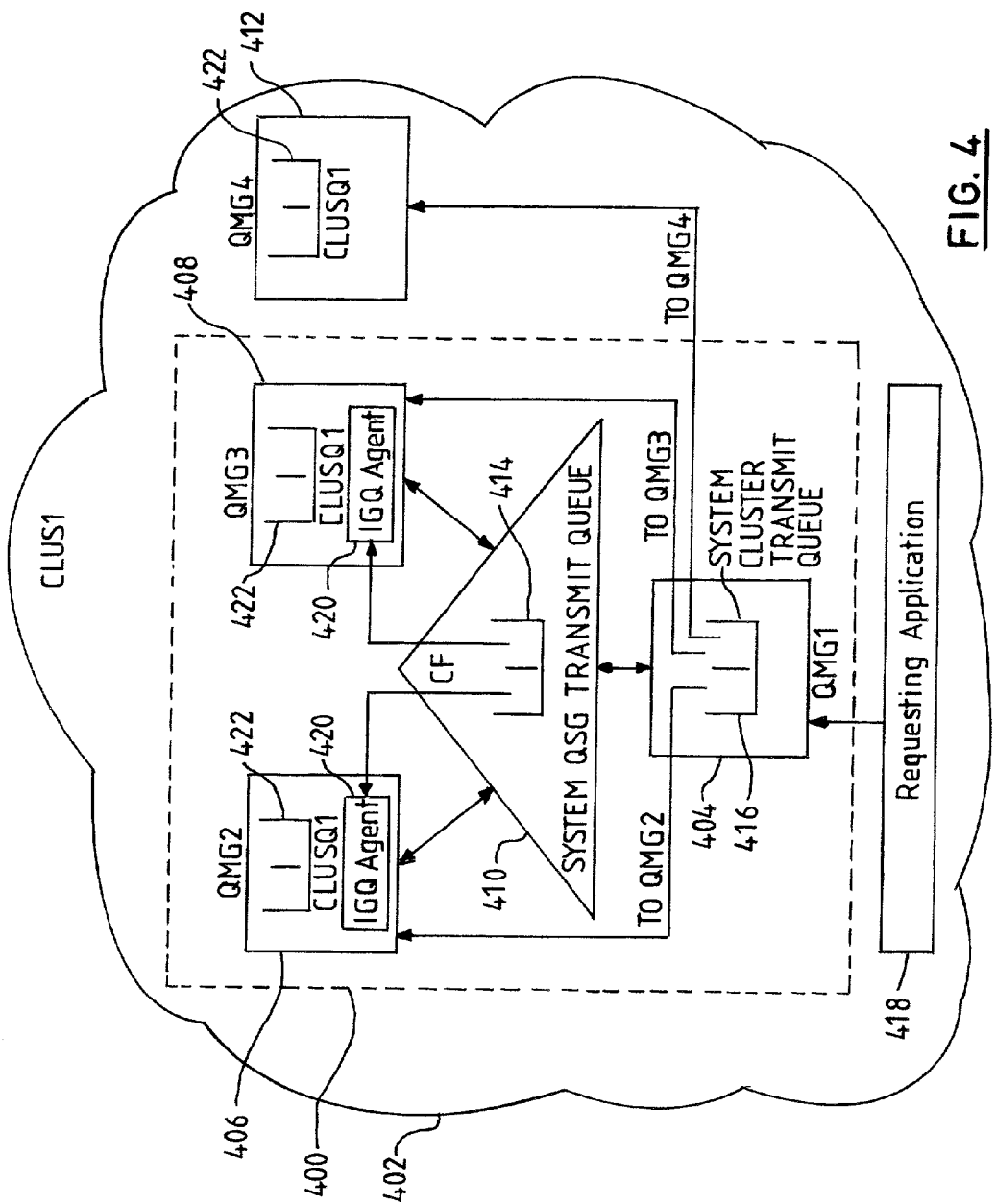
FIG. 4 shows a representation of intra-group queuing in a queue sharing group with a cluster in accordance with the present invention.

FIG. 4 shows intra-group queuing with a combination of a queue sharing group 400 and a cluster 402. The queue sharing group 400 has three queue managers 404, 406, 408 all connected to a coupling facility 410 with shared queues including a shared transmission queue 414. The three queue managers 404, 406, 408 all form a cluster with a fourth queue manager 412. Members of a cluster that are also members of a queue sharing group, can access a shared queue through any member of the queue sharing group.

When messages are sent to a cluster queue and the local and target destination queue managers are in the same queue sharing group, intra-group queuing is used for delivery of small non-persistent messages using the shared transmission queue 414. A local cluster transmission queue 416 is used for the delivery of persistent and large non-persistent messages. Also a cluster transmission queue is used for the delivery of messages to any queue manager that is in the cluster but outside the queue sharing group, for example the fourth queue manager 412 in FIG. 4.

FIG. 4 shows a requesting application 418 putting a message to a local transmission queue 416 on the first queue manager 404. The message is sent to the cluster queue 422 which is hosted on the other queue managers 406, 408, 412 in the cluster 402 via cluster channels. Alternatively, the message could have been put to the shared transmission queue 414 in the queue sharing group 400 and the message would then have been retrieved by the intra-group queuing agents 420 of the second and third queue managers 406, 408, but not by the fourth queue manager 412 which is not part of the queue sharing group 400.

The requesting application 418 does not need to be aware of the underlying mechanism used to deliver the messages. Multiple paths could be used for message delivery, for example both the cluster route and the intra-group queuing route.

A specific example of a queue manager product is IBM Corporation's MQSeries message queuing software. Message queuing and commercially available message queuing products are described in "Messaging and Queuing Using MQI", B. Blakeley, H. Harris & R. Lewis, McGraw-Hill, 1994, and in the following publications which are available from IBM Corporation: "An Introduction to Messaging and Queuing" (IBM Document number GC33-0805-00) and "MQSeries—Message Queue Interface Technical Reference" (IBM Document number SC33-0850-01). The network via which the computers communicate using message queuing may be the Internet, an intranet, or any heterogeneous or homogeneous data processing network. (IBM and MQSeries are trademarks of IBM Corporation).

IBM Corporation's MQSeries product family is available for a large number of different operating system and hardware platform environments, and provides the messaging and queuing services to application programs through program calls from its application programming interface, Message Queue Interface (MQI).

In IBM's OS/390 operating system environment, application programs connect to a given queue manager through an adapter (for example, the MQI call MQCONN for establishing a connection of an application to a queue manager will be sent from the application-hosting environment via an adapter). The adapter that is used depends on the type of application program. For example, an application program written for IBM's CICS transaction server product would connect through the CICS Adapter. (CICS and OS/390 are trademarks of IBM Corporation).

In a queue sharing group the shared data repository can be a DB2 database (DB2 is a trademark of IBM Corporation).

An MQSeries unit of work begins with the first in-sync point MQGET (to get a message from a queue) or MQPUT (to put a message into a queue) and ends with an explicit commit (MQCMIT) or backout (MQBACK), or an implicit commit (at MQDISC or normal end-of-task) or backout (abnormal end-of-task).

An intra-group queuing shared transmission queue is defined as SYSTEM.QSG.TRANSMIT.QUEUE.

Intra-group queuing has several advantages over regular distributed queuing using channels.

Since there is only one rather than two intermediate agents involved in the delivery of a message to a target queue, delivering a message via intra-group queuing is potentially less expensive than using a channel. In regular distributed queuing, a channel agent has both sending and receiving components. In intra-group queuing, there is only a receiving component since the need for the sending component has been removed. This is because the message is available to the receiving agent at the destination queue manager for delivery once the put operation has completed. Improved performance is achieved by reduced task switching and reduced logging compared to the sending agent in regular distributed queuing.

In a queue sharing group consisting of many queue managers, the number of channel definitions required to allow any to any queue manager connectivity grows as the square of the number of queue managers. This results in a rapid increase in the number of definitions required which also creates management problems. With intra-group queuing the number of agents increases only linearly with the number of queue managers in the queue sharing group.

Applications external to the queue sharing group can deliver messages to any queue within the queue sharing group whilst only connecting to one queue manager in the queue sharing group. This is because intra-group queuing allows messages arriving on a receiver channel destined for a remote queue manager to be transparently sent to the target queue manager. This allows applications to be deployed throughout the queue sharing group without requiring systems external to the queue sharing group to be changed.

Modifications and improvements can be made to the foregoing without departing from the scope of the present invention.

What is claimed is:

1. A system for communicating message data between applications programs on a plurality of subsystems of a computer network, the system comprising:
   a queue sharing group;
   at least one shared queue;
   at least one queue manager, having a channel initiator, local page sets and log data sets, wherein an application program can connect to any of the at least one queue manager;
   a shared data repository that stores queue definitions for the at least one shared queue, the shared data repository being accessible from all queue managers;
   a data repository manager component of each queue manager which controls connect, disconnect, read, write, delete and update requests to the shared data repository;
   a coupling facility having a microprocessor unit and data structures for the at least one shared queue, the coupling facility being accessible from all queue managers, wherein the coupling facility can hold multiple coupling facility data structures for the same queue sharing group and can couple data structures for more than one queue sharing group;
   a coupling facility manager component of each queue manager which provides connection services for connecting to the coupling facility data structures to perform read, write, delete, connect, disconnect, update and move operations on the data structures; and
   a shared transmission queue of the at least one shared queue, wherein the shared transmission queue is checked by a long running process of each subsystem for message data for the subsystem;

wherein the plurality of subsystems is a distributed network of resource managers, wherein the plurality of subsystems are part of a sysplex and all queue managers in the queue sharing group are in the same sysplex, wherein the at least one queue manager belongs to only one queue sharing group, wherein message data is sent from a first subsystem to a second subsystem by putting a message on the shared transmission queue and the second subsystem getting the message from the shared transmission queue, wherein the queue managers are able to access the same object definitions and message data concurrently, wherein the message data can be accessed by any queue manager in the same sysplex, wherein a queue manager is adapted to use a non-shared local queue, to store definitions of private objects, and to distinguish between the private objects and shared objects, wherein the queue sharing group has a single generic address that can be used to connect to any queue manager within the queue sharing group, and wherein channels and channel agents are not required to be active between queue managers in the queue sharing group.

* * * * *